United States Patent [19]

Endo et al.

[11] Patent Number: 5,604,005

[45] Date of Patent: Feb. 18, 1997

[54] MAGNETO-OPTICAL DISC

[75] Inventors: Hiroyuki Endo; Tsuyoshi Komaki; Hideki Hirata; Isamu Kuribayashi, all of Nagano, Japan

[73] Assignee: TDK Corporation, Tokyo, Japan

[21] Appl. No.: 322,421

[22] Filed: Oct. 13, 1994

[30] Foreign Application Priority Data

Oct. 19, 1993 [JP] Japan .................................. 5-284269

[51] Int. Cl.⁶ ................................................. G11B 5/66
[52] U.S. Cl. .................. 428/64.3; 428/64.6; 428/64.9; 428/65.1; 428/65.8; 428/336; 428/694 ML; 428/694 DE; 428/694 AH; 428/694 BP; 428/900
[58] Field of Search .................. 428/694 ML, 694 DE, 428/694 AH, 694 BD, 336, 900, 64.3, 64.6, 64.9, 65.1, 65.8

[56] References Cited

U.S. PATENT DOCUMENTS 4,383,001  5/1983  Fujiki ................................ 428/522
4,737,408  4/1988  Kuwahara ........................ 428/335
4,900,622  2/1990  Nakayama ....................... 428/336

FOREIGN PATENT DOCUMENTS

| 61-244051 | 4/1988 | Japan . |
| 63-188417 | 2/1990 | Japan . |
| 64-118718 | 12/1990 | Japan . |
| 64-118719 | 12/1990 | Japan . |
| 64-149680 | 1/1991 | Japan . |
| 64-171821 | 2/1991 | Japan . |
| 64-197738 | 3/1991 | Japan . |

*Primary Examiner*—Leszek Kiliman
*Attorney, Agent, or Firm*—Watson Cole Stevens Davis, PLLC

[57] ABSTRACT

A magneto-optical disc comprising a recording layer and a protective coating on a substrate is operated for magneto-optical recording in a magnetic field modulation mode such that the protective coating is in sliding contact with a magnetic head. The protective coating is obtained by curing with radiation a polymerizable composition which contains a fatty acid ester and radiation-curable compounds including a monofunctional (meth)acrylic monomer, a polyfunctional (meth)acrylic monomer, and optionally, an acrylic oligomer.

17 Claims, 1 Drawing Sheet

FIG. 1

MAGNETO-OPTICAL DISC

BACKGROUND OF THE INVENTION

1. Field of the Invention

This invention relates to a magneto-optical recording disc suitable for magneto-optical recording in a magnetic field modulation mode.

2. Prior Art

Optical discs are of great interest as high capacity information carrying media. Among the optical discs, magneto-optical discs of the magnetic field modulation system are expected to find use in data files and other advanced applications. A magneto-optical disc is recorded in a magnetic field modulation mode by directing a laser beam from an optical head to the recording layer of the disc in a DC manner for raising the temperature of the irradiated spot, and applying a modulated magnetic field across the recording layer from a magnetic head opposed to the optical head at the same time. Therefore, the magnetic field modulation mode allows for overwrite recording.

Most of conventional magneto-optical disc drives depend on a contact start and stop (CSS) system using a flying magnetic head. The magnetic head is in contact with the disc surface at the start and end of disc rotation. Thus the disc on the magnetic head facing surface is provided with a protective coating for protecting the magnetic head from adsorption and crushing.

For the protective coatings on magneto-optical discs of the CSS system, various resin compositions were proposed. For example, Japanese Patent Application Kokai (JP-A) Nos. 301040/1990 and 301041/1990 disclose a resin composition predominantly comprising a fluorinated polyurethane resin and JP-A 37844/1991 discloses a resin composition predominantly comprising a fluoro-resin soluble in organic solvents. It is also proposed to incorporate metal elements and lubricants in these resin compositions, the metal elements having greater ionization tendency than the transition metal element of which the recording film is made. JP-A 98857/1988 discloses to incorporate fluorinated carbon lubricant into resins such as epoxy resins. JP-A 40149/1990 discloses UV-curable resins having blended therein lubricants such as higher fatty acid esters (e.g., stearates), higher fatty acids, higher fatty acid amides, and silicone oil, JP-A 17844/1991 discloses a lubricating layer, and JP-A 62338/1991 discloses to disperse fine particulates of silicone resin or nickel on an overcoat layer for uniformly distributing asperities of 0.1 to 0.5 μm high on the surface. JP-A 222349/1988 and 70944/1989 provide an anti-crushing film on a protective film on a magneto-optical recording layer, the anti-crushing film on its surface being provided with a plurality of discrete micropores where the film is impregnated with liquid lubricant. Furthermore, JP-A 64937/1992 discloses a protective layer of a curable resin containing a plurality of voids where the layer is impregnated with lubricant.

Magneto-optical discs capable of recording/reading operation at the same normal chain velocity as compact discs (CD) are recently highlighted since they can share the drive unit with the CDs simply by adding or modifying the optical system. The CDs employ a normal chain velocity as low as 1.2 to 1.4 m/sec. at which the magnetic head cannot be aerodynamically lifted. Then the CSS system cannot be resorted to. One would attempt to use a stationary magnetic head which is held at a fixed, close distance from the disc surface. The stationary magnetic head, however, can collide with the disc due to axial runouts of the disc and vibration of the drive unit. Servo means must be provided in order to allow the head to follow axial runouts of the disc, resulting in a complex drive mechanism.

Under the circumstances, we reached the concept of a magnetic head in continuous contact with the disc surface and made research works on a magneto-optical disc capable of such operation. It was found that when the magnetic head was in sliding contact with the disc surface, the protective coatings previously proposed for the CSS system were unsatisfactory.

The protective coating having lubricant incorporated therein fails to retain lubricity for a sufficient time since the magnetic head is in continuous sliding contact with the protective coating surface. More specifically, the fluorinated carbon lubricants disclosed in JP-A 98857/1988 and the conventional stearates among higher fatty acid esters, higher fatty acids or ester amides thereof and silicone oil disclosed in JP-A 40149/1990 suffer from many problems including an increase in coefficient of friction during storage or usage, typically storage at high temperature, noise generation due to head sliding, a loss of dynamic performance, jitter occurrence, and low durability. Attempts to disperse fine particles in a protective coating in order to increase the surface roughness have the problems of noise generation due to head sliding and jitter occurrence. Fine particles of metal or ceramics can cause damage to the magnetic head because of their hardness. Protective coatings with micropores or voids where the coatings are impregnated with lubricant require a special resin material and a complex manufacturing step and have a short effective life because of insufficient durability and friction properties.

Among the above-mentioned protective coatings, a protective coating having a lubricant incorporated in a UV-cured resin is obtained by adding the lubricant to a UV-curable compound and applying the composition to form a coating, followed by curing. If the UV-curable compound and the lubricant are less compatible, the composition could not be effectively coated or the resulting coating would have unsatisfactory properties and insufficient hardness. Then this protective coating is less effective for reducing friction and fails to function as a wear resistant coating.

SUMMARY OF THE INVENTION

A primary object of the present invention is to provide a magneto-optical disc adapted for operation in continuous sliding contact with a magnetic head and having a protective coating which can be readily coated, has satisfactory properties and hardness, provides minimized friction with the magnetic head, maintains the friction minimizing ability during high temperature storage, during operation and even after contact with alcohols and other chemicals, thus minimizing head sliding noise and jitter, and is durable and resistant against sliding on the magnetic head, and wear resistant.

The present invention is directed to a magneto-optical disc comprising a substrate, a recording layer thereon, and a protective coating on the recording layer. The protective coating is formed on the recording layer by curing a polymerizable composition with radiation and has an outer surface remote from the substrate and an inner surface adjacent to the substrate or recording layer. The disc is operated for magneto-optical recording in a magnetic field modulation mode such that the outer surface of the protective coating is in sliding contact with a magnetic head.

According to the present invention, the protective coating is obtained by curing a polymerizable composition with radiation. The polymerizable composition contains (A) a fatty acid ester and (B) a radiation-curable compound mixture which includes (B1) a monofunctional acrylic or methacrylic monomer compatible with the fatty acid ester and (B2) a polyfunctional (i.e., difunctional or more) acrylic or methacrylic monomer. The polymerizable composition contains 10 to 50 parts by weight of the monofunctional (meth)acrylic monomer and 90 to 50 parts by weight of the polyfunctional (meth)acrylic monomer, provided that the total weight of the monofunctional and polyfunctional (meth)acrylic monomers is 100 parts by weight. The composition contains 0.1 to 20% by weight of the fatty acid ester (A) based on the total weight of the monofunctional and polyfunctional (meth)acrylic monomers (B1)+(B2).

In one preferred embodiment, the radiation-curable compound mixture further includes (B3) an acrylic oligomer in an amount of up to 10% by weight based on the total weight of the monofunctional and polyfunctional (meth)acrylic monomers (B1)+(B2). In this embodiment, the polymerizable composition contains 0.1 to 20% by weight of the fatty acid ester (A) based on the total weight of the monofunctional and polyfunctional (meth)acrylic monomers and the acrylic oligomer (B1)+(B2)+(B3).

Typically the monofunctional (meth)acrylic monomer is compatible with the fatty acid ester such that the fatty acid ester has a solubility in the monofunctional (meth)acrylic monomer at 25° C. which is at least 70 parts by weight as expressed by the maximum parts by weight of the fatty acid ester soluble in 100 parts by weight of the monofunctional (meth)acrylic monomer.

Typically, the polymerizable composition further contains a photo-polymerization initiator in an amount of 1 to 10% by weight based on the total weight of the monofunctional and polyfunctional (meth)acrylic monomers and the optional acrylic oligomer.

Preferably the fatty acid ester is of the following formula (I):

$$R^1—COO—R^2 \qquad (I)$$

wherein $R^1$ is a normal chain or branched saturated aliphatic hydrocarbon residue having at least 10 carbon atoms or an unsaturated aliphatic hydrocarbon residue having at least 10 carbon atoms, and $R^2$ is a branched saturated aliphatic hydrocarbon residue having at least 10 carbon atoms or an unsaturated aliphatic hydrocarbon residue having at least 10 carbon atoms. Preferably $R^1$ is a normal chain saturated aliphatic hydrocarbon residue having 10 to 30 carbon atoms and $R^2$ is a branched saturated aliphatic hydrocarbon residue having 10 to 30 carbon atoms. Preferably the fatty acid ester is liquid at room temperature.

Preferably the monofunctional (meth)acrylic monomer is of the following formula (II):

$$A—O—R \qquad (II)$$

wherein A is an acryloyl group or methacryloyl group, and R is an alkyl, cycloalkyl or aryl group, preferably having 5 to 20 carbon atoms in total.

Preferably the fatty acid ester is distributed at the surface of the protective coating. In one preferred embodiment, the protective coating includes a plurality of micropores in the surface and the fatty acid ester is contained within the micropores. More preferably the protective coating includes micropores distributed in an outside region thereof extending from the outer surface to one-half of its thickness, with the fatty acid ester being contained in the micropores.

Preferably the content of the fatty acid ester in an outside region of the protective coating extending from the outer surface to one-half of its thickness is greater than the content of the fatty acid ester in an inside region of the protective coating extending from the inner surface adjacent to the recording layer to one-half of its thickness.

Typically the protective coating is 1 to 30 μm thick.

ADVANTAGES

In the magneto-optical disc of the invention, the resinous protective coating presenting a surface to come in sliding contact with the magnetic head is formed from a polymerizable composition containing specific amounts of radiation-curable compounds, especially UV-curable compounds including a monofunctional (meth)acrylic monomer and a polyfunctional (meth)acrylic monomer and optionally an acrylic oligomer and a specific amount of a fatty acid ester, by coating the composition and curing the coating with radiation, especially UV radiation.

Since the selected monofunctional (meth)acrylic monomer is well compatible with the fatty acid ester, the composition is readily applicable to form a coating having satisfactory properties and hardness after curing. The resulting coating is well durable and effective for reducing friction and thus fully functions as a wear resistant protective coating. The disc which is operated in continuous sliding contact with the magnetic head is fully reduced in friction with the head. Little or no noise generates during sliding motion of the disc across the head and jitter is minimized. After high temperature storage, after operation and even after contact with alcohols and other chemicals, the protective coating is effective for minimizing any increase of friction, sliding noise and jitter. Little or no damage is brought to the magnetic head operating in continuous contact with the disc. These advantages are enhanced when a monofunctional (meth)acrylic monomer having a specific structure and a fatty acid ester having a specific branched or unsaturated structure are used. The advantages are further enhanced when micropores are locally formed in or near the outer surface of the protective coating as a result of radiation curing and additionally the fatty acid ester is locally segregated in or near the outer surface, preferably contained in the micropores.

BRIEF DESCRIPTION OF THE DRAWING

The only FIGURE.

DETAILED DESCRIPTION OF THE INVENTION

The magneto-optical disc of the present invention includes a recording layer on a substrate and a protective resinous coating disposed adjacent the recording layer.

Figure 1:
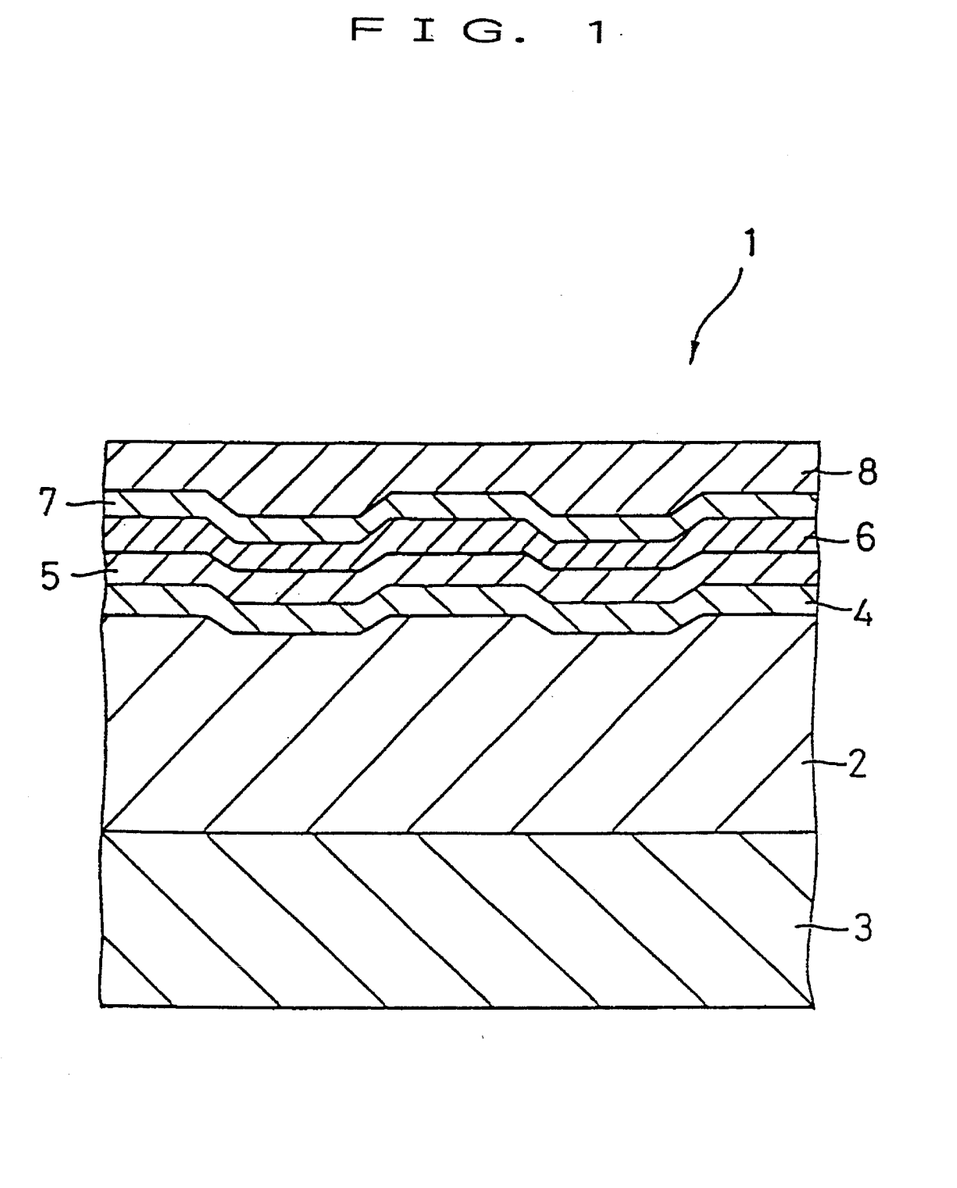
FIG. 1 is a fragmental cross section of a magneto-optical disc according to one preferred embodiment of the invention.

Referring to FIG. 1, there is illustrated in cross section a portion of a magneto-optical recording disc generally designated at 1 according to one preferred embodiment of the invention. The disc 1 includes a lower protective layer 4, a recording layer 5, an upper protective layer 6, a reflective layer 7, and a protective coating 8 stacked on one major surface of a substrate 2 in the described order. The protective coating 8 has an outer surface remote from the substrate 2 and an inner surface adjacent to the substrate 2, more specifically in close contact with the reflective layer 7 in the illustrated embodiment. Unless otherwise stated, the surface of the protective coating 8 refers to the outer surface. The disc 1 further includes a hard coat 3 on the opposite or rear major surface of the substrate 2. During operation, the disc is driven for rotation such that a magnetic head (not shown) is in continuous sliding contact with the outer surface of the protective coating 8. Usually the magnetic head is supported by suspension means so that the head may follow axial runouts of the rotating disc, maintaining the head in continuous contact with the disc surface.

The protective coating 8 is obtained by curing a polymerizable composition with radiation. The polymerizable composition contains (A) a fatty acid ester and (B) a radiation-curable compound mixture which includes (B1) a monofunctional (meth)acrylic monomer, (B2) a polyfunctional (meth)acrylic monomer, and optionally (B3) an acrylic oligomer.

The monofunctional (meth)acrylic monomer (B1) should be compatible with the fatty acid ester (A). The term "compatible" used herein means that when a generally liquid fatty acid ester and a generally liquid monofunctional (meth) acrylic monomer are combined together, they mix homogeneously without developing white turbidity. Preferably, the fatty acid ester has a solubility in the monofunctional (meth)acrylic monomer at 25° C. which is at least 70 parts by weight as expressed by the maximum parts by weight of the fatty acid ester soluble in 100 parts by weight of the monofunctional (meth)acrylic monomer. No upper limit is imposed on the solubility.

By the term "monofunctional" it is meant that a (meth) acrylic monomer has one double bond, typically in a (meth) acryloyl group. The term "polyfunctional" used herein means difunctional or more as opposed to the ordinary terminology to indicate trifunctional or more. Therefore, by the term "polyfunctional" it is meant that a (meth) acrylic monomer has at least two double bonds, typically in a (meth)acryloyl group.

The polymerizable composition contains 10 to 50 parts, preferably 12 to 45 parts by weight of the monofunctional (meth)acrylic monomer (B1) and 90 to 50 parts, preferably 88 to 58 parts by weight of the polyfunctional (meth)acrylic monomer (B2), provided that the total weight of the monofunctional and polyfunctional (meth)acrylic monomers, (B1)+(B2), is 100 parts by weight.

Polymerizable compositions within such a blending proportion are readily applicable and form coatings having good properties and hardness. The resulting coating serves as a protective coating which is effective for reducing friction, resistant against damages upon sliding contact, and durable. If the content of the monofunctional (meth)acrylic monomer is less than 10 parts by weight and the content of the polyfunctional (meth)acrylic monomer is more than 90 parts by weight, the fatty acid ester becomes less compatible in the composition which becomes less efficient to apply. There results an uneven coating having inferior properties and less effective in reducing friction. Similar problems arise when the monofunctional (meth)acrylic monomer used is less compatible with the fatty acid ester. Inversely, if the content of the monofunctional (meth)acrylic monomer is more than 50 parts by weight and the content of the polyfunctional (meth)acrylic monomer is less than 50 parts by weight, the resulting coating is low in hardness and wear resistance, less resistant against flaws and less durable.

Further the polymerizable composition contains 0.1 to 20%, especially 0.5 to 10% by weight of the fatty acid ester (A) based on the total weight of the monofunctional and polyfunctional (meth)acrylic monomers, (B1)+(B2). Less than 0.1% of the fatty acid ester is ineffective for reducing friction whereas more than 20% of the fatty acid ester exacerbates dispersion and application property and can hinder curing of radiation-curable resins.

As described above, the present invention is characterized by the use of specific amounts of the fatty acid ester and the monofunctional (meth)acrylic monomer compatible therewith for improving spreadability and reducing the friction of a coating and the use of a specific amount of the polyfunctional (meth)acrylic monomer for increasing the hardness and durability of a coating. The advantages of the invention are available only with the composition defined herein.

In the polymerizable composition of the invention, the radiation-curable compound mixture may further include (B3) an acrylic oligomer in addition to the monofunctional and polyfunctional (meth)acrylic monomers (B1) and (B2). Use of an acrylic oligomer will further increase the hardness of a coating.

Preferably the polymerizable composition contains up to 10%, especially up to 8% by weight of the acrylic oligomer (B3) based on the total weight of the monofunctional and polyfunctional (meth)acrylic monomers, (B1)+(B2), Within this range, the acrylic oligomer is effective for increasing the hardness of a coating without adversely affecting application properties. Too high contents of the acrylic oligomer in the polymerizable composition would render the fatty acid ester less compatible and results in a coating composition which is too viscous to apply and has poor friction properties.

In the embodiment wherein the acrylic oligomer is added to the polymerizable composition, the content of the fatty acid ester (A) should be 0.1 to 20%, especially 0.5 to 10% by weight of based on the total weight of the monofunctional and polyfunctional (meth)acrylic monomers and the acrylic oligomer, (B1)+(B2)+(B3).

The fatty acid ester (A) is preferably of the following formula.

$$R^1\text{—COO—}R^2 \tag{I}$$

$R^1$ is a normal chain saturated aliphatic hydrocarbon residue having at least 10 carbon atoms, preferably 10 to 30 carbon atoms, more preferably 11 to 24 carbon atoms. Alternatively, $R^1$ is a branched saturated aliphatic hydrocarbon residue having at least 10 carbon atoms, preferably 10 to 30 carbon atoms, more preferably 10 to 24 carbon atoms. The branched hydrocarbon may include 1 to 10 branches, preferably 1 to 5 branches which may have any desired number of carbon atoms. Alternatively, $R^1$ is an unsaturated aliphatic hydrocarbon residue having at least 10 carbon atoms, preferably 10 to 30 carbon atoms, more preferably 12 to 24 carbon atoms. The unsaturated hydrocarbon may include 1 to 3 double bonds, preferably 1 or 2 double bonds which may be at any desired position. Most often the unsaturated hydrocarbon is normal chain.

$R^2$ is a branched saturated aliphatic hydrocarbon residue having at least 10 carbon atoms, preferably 10 to 30 carbon atoms, more preferably 10 to 24 carbon atoms. The branched hydrocarbon may include 1 to 10 branches, preferably 1 to 5 branches which may have any desired number of carbon atoms. Alternatively, $R^2$ is an unsaturated aliphatic hydrocarbon residue having at least 10 carbon atoms, preferably 10 to 30 carbon atoms, more preferably 12 to 24 carbon atoms. The unsaturated hydrocarbon may include 1 to 3 double bonds, preferably 1 or 2 double bonds which may be at any desired position. Most often the unsaturated hydrocarbon is normal chain.

Most preferred are those fatty acid esters of formula (I) wherein $R^1$ is a normal chain saturated aliphatic hydrocarbon residue and $R^2$ is a branched saturated aliphatic hydrocarbon residue since they experience minimal deterioration by high-temperature storage and operation and provide a low coefficient of friction. These fatty acid esters are liquid at room temperature and preferably have a melting point between −40° C. and 20° C., especially between −30° C. and 10° C. The fatty acid esters preferably have about 20 to 40 carbon atoms in total.

Examples of the fatty acid ester are listed in Table 1. These fatty acid esters are commercially available.

TABLE 1

| No. | Designation | $R_1$ | $R_2$ |
|---|---|---|---|
| 1 | isocetyl myristate | $C_{13}H_{27}-$ | $\begin{array}{c}CH_3(CH_2)_7 \\ CH_3(CH_2)_5\end{array}\!\!>\!CHCH_2-$ |
| 2 | octyldodecyl myristate | $C_{13}H_{27}-$ | $\begin{array}{c}C_8H_{17} \\ C_{10}H_{21}\end{array}\!\!>\!CHCH_2-$ |
| 3 | isocetyl stearate | $C_{17}H_{35}-$ | $\begin{array}{c}CH_3(CH_2)_7 \\ CH_3(CH_2)_5\end{array}\!\!>\!CHCH_2-$ |
| 4 | isotridecyl myristate | $C_{13}H_{27}-$ | $\begin{array}{c}CH_3(CH_2)_7 \\ CH_3(CH_2)_2\end{array}\!\!>\!CHCH_2-$ |
| 5 | isotridecyl stearate | $C_{17}H_{35}-$ | $\begin{array}{c}CH_3(CH_2)_7 \\ CH_3(CH_2)_2\end{array}\!\!>\!CHCH_2-$ |
| 6 | isotridecyl laurate | $C_{11}H_{23}-$ | $\begin{array}{c}CH_3(CH_2)_7 \\ CH_3(CH_2)_2\end{array}\!\!>\!CHCH_2-$ |
| 7 | isocetyl palmitate | $C_{15}H_{31}-$ | $\begin{array}{c}CH_3(CH_2)_7 \\ CH_3(CH_2)_5\end{array}\!\!>\!CHCH_2-$ |
| 8 | isocetyl laurate | $C_{11}H_{23}-$ | $\begin{array}{c}CH_3(CH_2)_7 \\ CH_3(CH_2)_5\end{array}\!\!>\!CHCH_2-$ |
| 9 | isotetradecyl stearate | $C_{17}H_{35}-$ | $\begin{array}{c}CH_3(CH_2)_7 \\ CH_3(CH_2)_3\end{array}\!\!>\!CHCH_2-$ |
| 10 | octyldodecyl stearate | $C_{17}H_{35}-$ | $\begin{array}{c}C_8H_{17} \\ C_{10}H_{21}\end{array}\!\!>\!CHCH_2-$ |
| 11 | isostearyl stearate | $C_{17}H_{35}-$ | $\begin{array}{c}(CH_3)_3CCH_2CH(CH_3) \\ (CH_3)_3CCH_2CH(CH_3)CH_2CH_2\end{array}\!\!>\!CHCH_2-$ |
| 12 | isostearyl myristate | $C_{13}H_{27}-$ | $\begin{array}{c}(CH_3)_3CCH_2CH(CH_3) \\ (CH_3)_3CCH_2CH(CH_3)CH_2CH_2\end{array}\!\!>\!CHCH_2-$ |
| 13 | oleyl oleate | $CH_3(CH_2)_7CH\!=\!CH(CH_2)_7-$ | $-(CH_2)_3CH\!=\!CH(CH_2)_7CH_3$ |
| 14 | isocetyl oleate | $CH_3(CH_2)_7CH\!=\!CH(CH_2)_7-$ | $\begin{array}{c}CH_3(CH_2)_7 \\ CH_3(CH_2)_5\end{array}\!\!>\!CHCH_2-$ |
| 15 | isostearyl oleate | $CH_3(CH_2)_7CH\!=\!CH(CH_2)_7-$ | $\begin{array}{c}(CH_2)_3CCH_2CH(CH_3) \\ (CH_3)_3CCH_2CH(CH_3)CH_2CH_2\end{array}\!\!>\!CHCH_2-$ |

TABLE 1-continued

| No. | Designation | R₁ | R₂ |
|---|---|---|---|
| 16 | oleyl laurate | $C_{11}H_{23}-$ | $-(CH_2)_3CH=CH(CH_2)_7CH_3$ |
| 17 | oleyl isostearate | $(CH_3)_3CCH_2CH(CH_3)$<br>$(CH_3)_3CCH_2CH(CH_3)CH_2CH_3$ >CH- | $-(CH_2)_3CH=CH(CH_2)_7CH_3$ |
| 18 | isocetyl isostearate | $(CH_3)_3CCH_2CH(CH_3)$<br>$(CH_3)_3CCH_2CH(CH_3)CH_2CH_3$ >CH- | $CH_3(CH_2)_7$<br>$CH_3(CH_2)_5$ >CHCH_2- |
| 19 | isostearyl isostearate | $(CH_3)_3CCH_2CH(CH_3)$<br>$(CH_3)_3CCH_2CH(CH_3)CH_2CH_3$ >CH- | $(CH_3)_3CCH_2CH(CH_3)$<br>$(CH_3)_3CCH_2CH(CH_3)CH_2CH_2$ >CHCH_2- |
| 20 | isotridecyl isostearate | $(CH_3)_3CCH_2CH(CH_3)$<br>$(CH_3)_3CCH_2CH(CH_3)CH_2CH_3$ >CH- | $CH_3(CH_2)_7$<br>$CH_3(CH_2)_2$ >CHCH_2- |

The fatty acid esters may be used alone or in admixture of two or more. In one preferred embodiment, the fatty acid ester is contained in the polymerizable composition in the specific amount and uniformly dispersed therein whereupon the fatty acid ester is uniformly dispersed and distributed in a coating which serves as the protective coating 8. In another preferred embodiment, the fatty acid ester is locally distributed in a sub-surface stratum of the protective coating, for example, by applying a solution of the fatty acid ester to a protective coating. In the illustrated embodiment of FIG. 1, the protective coating 8 is a single layer, but may include a plurality of sub-layers wherein the fatty acid ester is introduced into a sub-layer or sub-layers disposed on the outer surface side. The protective coating consisting of two or more sub-layers is improved in weathering resistance since pinholes are offset between the sub-layers.

The monofunctional (meth)acrylic monomer (B1) compatible with the fatty acid ester (A) is preferably of the general formula (II):

$$A-O-R \qquad (II)$$

wherein A is an acryloyl group ($CH_2=CHCO-$) or methacryloyl group ($CH_2=C(CH_3)CO-$), and R is an alkyl, cycloalkyl or aryl group.

The alkyl group represented by R may be straight or branched and substituted or unsubstituted. Exemplary substituents include heterocyclic groups such as tetrahydrofuryl and aryl groups such as phenyl. Preferably the alkyl group has 5 to 20 carbon atoms in total. More preferably R is an alkyl group represented by $-C_nH_{2n+1}$ wherein n is 6 to 16, a tetrahydrofurfuryl group as shown below or a benzyl group.

tetrahydrofurfuryl

The cycloalkyl group represented by R may be substituted or unsubstituted and monocyclic or fused polycyclic or bridged cyclic. Preferably it has 5 to 20 carbon atoms in total. Examples are cyclohexyl, isobornyl and dicyclopentanyl groups as shown below.

isobornyl   dicyclopentanyl

The aryl group represented by R may be substituted or unsubstituted. Preferably it has 5 to 20 carbon atoms in total. Phenyl is a typical example.

Preferably the monofunctional (meth)acrylic monomer (B1) is liquid at room temperature and has a melting point of up to 20° C., especially up to 10° C. The lower limit of melting point is not critical although it is generally about −90° C. The molecular weight is preferably less than 2,000.

Several illustrative, non-limiting examples of the monofunctional (meth)acrylic monomer (B1) are given below. These examples are commercially available.

TABLE 2

| Monomer No. | Designation | A | R |
|---|---|---|---|
| A-1 | lauryl acrylate | $CH_2=CHCO-$ | $C_{12}H_{25}-$ |
| A-2 | tetrahydro-furfuryl acrylate | $CH_2=CHCO-$ |  |
| A-3 | dicyclopentanyl acrylate | $CH_2=CHCO-$ |  |
| A-4 | benzyl methacrylate | $CH_2=C(CH_3)CO-$ | ⌬—CH_2— |
| A-5 | phenyl methacrylate | $CH_2=C(CH_3)CO-$ | ⌬ |

The monofunctional (meth)acrylic monomers may be used alone or in admixture of two or more.

The polyfunctional, difunctional or more, (meth)acrylic monomer (B2) is typically a monomer having at least two acrylic double bonds in a molecule as a group capable of crosslinking or polymerizing upon exposure to radiation, the double bonds being as given by acrylic acid, methacrylic acid or esters thereof having an unsaturated double bond which is sensitive to ionization energy and radical polymerizable.

Preferred polyfunctional (meth)acrylic monomers are compounds having a molecular weight of less than 2,000. Preferred examples include ethylene glycol diacrylate, ethylene glycol dimethacrylate, diethylene glycol diacrylate, 1,6-hexaneglycol diacrylate, 1,6-hexaneglycol dimethacrylate, neopentyl glycol diacrylate (and methacrylate), hydroxypivalic acid neopentyl glycol diacrylate (and methacrylate), pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers, and difunctional or more derivatives thereof having a functional group such as COOH incorporated therein, difunctional or more acrylates and methacrylates of phenol ethylene oxide adducts, and difunctional or more compounds having a pentaerythritol fused ring having an acryl or methacryl group or ε-caprolactone-acryl group attached thereto as disclosed in Japanese Patent Application No. 072888/1987, and difunctional or more special acrylates as disclosed in Japanese Patent Application No. 072888/1987.

The polyfunctional (meth)acrylic monomers may be used alone or in admixture of two or more.

The acrylic oligomer (B3) preferably has a molecular weight of 2,000 to 10,000. Exemplary oligomers include oligomers derived from the above-mentioned monofunctional or polyfunctional (meth)acrylic monomers; oligomers derived from ethyl acrylate, diethylene glycol methacrylate, and pentaerythritol acrylate (methacrylate); oligo-ester acrylates, acryl-modified urethane elastomers and modified ones thereof having a functional group such as COOH incorporated therein.

The acrylic oligomers may be used alone or in admixture of two or more.

Although the radiation-curable compound mixture used herein preferably consists of the above-mentioned monofunctional and polyfunctional (meth)acrylic monomers and optionally, acrylic oligomer, it is acceptable to use another radiation-curable compound in combination therewith.

Since the polymerizable composition is cured by exposure to radiation, especially ultraviolet (UV) radiation, it preferably contains a photo-polymerization initiator or sensitizer. Any desired photo-polymerization initiator or sensitizer may be used, for example, acetophenones, benzoins, benzophenones, and thioxanthones. A mixture of photo-polymerization initiators may be used. Preferably the polymerizable composition contains about 1 to 10%, more preferably 2 to 6% by weight of photo-polymerization initiator based on the total weight of the monofunctional and polyfunctional (meth)acrylic monomers and optional acrylic oligomer. Such a polymerizable composition may be synthesized by conventional methods or prepared by mixing commercially available compounds.

In the preferred protective coating, the fatty acid ester is segregated in the radiation-cured resin near the surface. More specifically, the fatty acid ester is preferably present on the protective coating surface. Provided that the protective coating is divided at a level of one-half of its thickness into an outside region which extends from the outer surface to one-half of the thickness and an inside region which extends from the inner surface to one-half of the thickness, the concentration of fatty acid ester is preferably graded such that the content of fatty acid ester in the outside region (Co) is greater than the content of fatty acid ester in the inside region (Ci). Since the fatty acid ester used herein does not bond with the resin after radiation curing, whether or not it is present on the protective coating surface can be determined by washing the surface with a suitable solvent (e.g., acetone, ethanol, chloroform, toluene, and benzene), or extracting it with ultrasonic wave and fixing it in a gas chromatograph. In this regard, better performance is expected when the amount of fatty acid ester borne on the surface is about 1 to 500 mg/m$^2$.

The fatty acid ester contents in the outside and inside regions (Co and Ci) may be determined by actually cutting the protective coating at a level of one-half of its thickness, extracting each of the outside and inside regions with solvent, followed by gas chromatographic analysis. Alternatively, Co and Ci may be presumed by determining the amounts of fatty acid ester borne at the protective coating outer surface, the cross section at the one-half level of the thickness, and the protective coating inner surface. Preferably, the ratio of Ci/Co is up to 1/5, especially from 0 to 1/10. The segregation or local distribution of the fatty acid ester on the outer surface or in the outside region leads to a lower coefficient of friction, more stable dynamic durability, less generation of sliding noise, and stabilized jitter as well as reduced deterioration of these properties with time during storage or operation.

In the above-mentioned embodiment wherein the fatty acid ester is segregated in the surface region of the protective coating, better results are obtained when the protective coat, especially on the surface, is provided with micropores and the fatty acid ester is contained in the micropores near the surface. In this preferred embodiment, not only the fatty acid ester is segregated in the surface region of the protective coating, but also micropores defining a closed space are distributed at or near the surface, with some micropores being cut off or opening at the coating surface. The micropores are distributed preferably in the outside region of the protective coating, more preferably only in the surface of the protective coating although such local distribution depends on the total thickness of the protective coating. The distribution of micropores only in the surface of the protective coating implies that micropores are formed in the surface while they are open at the surface since they are interrupted thereat. Then there are no or few micropores defining a closed space in the protective coating.

Preferably the micropores have an average diameter of about 0.01 to 1 μm and a depth of about 0.01 to 1 μm. Then the region where micropores are distributed in the protective coating is preferably limited to a depth of up to 2 μm from the surface, more preferably up to 1.2 μm from the surface, especially from 0.01 μm to 1.2 μm below the surface. The population of micropores on the protective coating surface or in a region from the surface to a depth of 2 μm preferably ranges from 50 to 500 pores per 10 μm$^2$ as viewed from above.

It is desirable that micropores are substantially absent in the inside region of the protective coating extending from the lower surface to the half thickness level. Substantial absence of micropores implies that the population of micropores is up to 10 pores per 10 μm$^3$, especially zero.

Micropores formed in the coating surface are preferably filled with the fatty acid ester. In this regard, the fatty acid ester may partially overflow from the pores onto the coating surface and most desirably, the overflowing fatty acid ester forms a thin film covering the protective coating surface. Such a film is about 10 to 500 nm thick provided that the pore depth is negligible.

In addition to equivalent advantages to the former embodiment wherein the fatty acid ester is segregated in a surface region of the protective coating, the embodiment wherein micropores are formed in or near the protective coating surface and the fatty acid ester is present in the micropores provides an additional advantage of improved retention of lubricating capability. The protective coating experiences a minimal loss of friction properties even after contact with alcohols and other chemicals.

The presence of micropores may be observed under an optical microscope or scanning electron microscope (SEM). Similarly, the diameter, depth, and number per unit area or unit volume of micropores may be determined from an SEM observation.

The amount of fatty acid ester borne on the surface may be the same as in the former embodiment and determined in the same manner as in the former embodiment.

Understandably, if the protective coating includes a plurality of layers, the surface side layer is formed with micropores where the fatty acid ester is contained.

The protective coating 8 is formed on the reflective layer 7 by any desired method, for example, by applying onto the reflective layer a polymerizable composition comprising predetermined amounts of radiation-curable compounds and fatty acid ester as defined previously. The application method is not critical and may be selected from conventional well-known methods including spin coating, screen printing, gravure coating, spray coating and dipping. The conditions under which the protective coating is formed may be determined by taking into account the viscosity of a polymerizable composition, the desired coating thickness, and other factors without undue experimentation. Spin coating is preferred for a protective coating of a single layer structure or the lowermost layer of a protective coating if it is of a multi-layer structure. Then mass productivity is improved while the influence of dust and debris is precluded.

Thereafter, the coating is cured by exposing to UV radiation, or by heating and then exposing to UV radiation if desired. Electron radiation may be used instead of UV radiation. Typically, coatings are exposed to UV radiation at an intensity of at least about 50 mW/cm$^2$ and a dose of about 200 to 2,000 mJ/cm$^2$. The UV radiation source may be any of conventional ones such as mercury lamps. On UV exposure, the compounds undergo radical polymerization.

In order to allow the fatty acid ester to segregate in proximity to the protective coating surface, UV-assisted curing should preferably be slow or relatively retarded so that the fatty acid ester may migrate and gather to a surface stratum during curing. Such slow curing can be accomplished by irradiating UV radiation to an integrated dose of about 200 to 1,000 mJ/cm$^2$ so as to give a surface temperature of 30° to 65° C.

In order to form micropores in the surface and distribute the fatty acid ester therein, radiation curing may be done under substantially the same conditions as used for the surface segregation. Exact conditions may be determined by taking into account the type of fatty acid ester and radiation-curable compounds and a ratio of these components in a coating composition. Since the fatty acid ester is compatible with radiation-curable compounds in the coating composition before curing, the spin coating and curing conditions are controlled such that micropores may be formed in the surface and the fatty acid ester be collected therein.

The protective coating preferably has a (total) thickness of 1 to 30 μm, more preferably 2 to 20 μm. Though not always, thinner coatings might be sometimes difficult to form to uniform thickness and less durable whereas thicker coatings might crack due to shrinkage upon curing and cause warpage of the disc. In addition, thicker coatings have a likelihood that the resin might have cured before segregation of the lubricant (e.g., fatty acid esters) on the surface or without leaving micropores.

Now the remaining components of the disc are described.

The substrate 2 is generally formed of glass or transparent resins such as polycarbonate, acrylic resins, amorphous polyolefins, and styrene resins. Such a choice is made because the magneto-optical disc of the invention is recorded and read by using an optical head positioned on the rear surface side of the substrate 2 (the lower side in FIG. 1) and directing a laser beam to the recording layer 5 through the substrate 2. The surface of the substrate 2 on which the recording layer 5 is formed is conventionally provided with grooves and pits for tracking and addressing purposes.

The lower and upper protective layers 4 and 6 are effective for improving C/N and protecting the recording layer against corrosion and generally have a thickness of about 30 to 300 nm. Although the provision of such protective layers is not critical to the invention, it is desired to form either one of the lower and upper protective layers, especially both. The protective layers may be formed from dielectric materials such as oxides, carbides, nitrides, sulfides and mixtures thereof and by conventional gas phase deposition methods such as sputtering, evaporation, and ion plating.

The recording layer 5 disposed between the substrate 2 and the protective coating 8, more specifically between the first and second dielectric layers 4 and 6 is one in which information can be magnetically recorded using a modulated magnetic field and the recorded information be read through magneto-optical conversion. The recording layer 5 may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. Some preferred examples of the recording layer composition are TbFeCo, DyTbFeCo, NdDyFeCo, and NdGdFeCo. The recording layer is generally about 10 to 1,000 nm thick.

The reflective layer 7 is optionally disposed on the second dielectric layer 6 and formed of any of relatively high reflectivity metal materials which include Au, Ag, Pt, Al, Ti, Cr, Ni and Co and alloys or compounds thereof. The reflective layer may be formed in a similar manner to the recording layer 5. The reflective layer is generally about 30 to 200 nm thick.

On the rear surface of the substrate 2 is formed a transparent hard coating 3 as shown in FIG. 1, if desired. The composition and thickness of the hard coating are the same as the protective coating 8 except for the fatty acid ester. Preferably the hard coating 3 is rendered antistatic by adding a surfactant or the like. The hard coating may be disposed not only on the rear surface of the substrate, but also on the inner and outer peripheral edges of the disc.

EXAMPLE

Examples of the present invention are given below by way of illustration and not by way of limitation.

Example 1

Magneto-optical disc samples, Nos. 1 to 8, were prepared as reported in Table 3.

First, a disc-shaped polycarbonate substrate having an outer diameter of 64 mm, an inner diameter of 11 mm and a recording area thickness of 1.2 mm was coated on one major surface and outer and inner peripheral edges with a hard coating composition which was cured with UV radiation to form a hard coating of about 5 μm thick.

Next a first protective layer of SiNx was deposited on the opposite major surface of the substrate by RF magnetron sputtering to a thickness of 80 nm. A recording layer of the composition: $Tb_{23}Fe_{72}Co_5$ was then deposited on the first protective layer by sputtering to a thickness of 20 nm. A second protective layer of the same composition as the first one was deposited on the recording layer by RF magnetron sputtering to a thickness of 20 nm. An aluminum alloy reflective layer of 80 nm and a protective coating were then provided on the second protective layer.

The protective coating was formed by spin coating the following polymerizable composition and exposing the coating to UV radiation in a dose of 500 mJ/cm² for curing. The coating reached a surface temperature of 55° C. At the end of curing, the protective coating had an average thickness of about 5 μm.

| Polymerizable composition | Parts by weight |
| --- | --- |
| UV-curable compounds | 100 |
| Monofunctional (meth)acrylic monomer | (see Table 3) |
| Polyfunctional (meth)acrylic monomer | (see Table 3) |
| Photopolymerization initiator | 5 |
| Irgacure 907 (aminoacetophenone, Ciba Geigy Co.) | |
| Fatty acid ester | 3 |
| Isocetyl myristate | |

When isocetyl myristate was mixed with lauryl acrylate, tetrahydrofurfuryl acrylate and dicyclopentanyl acrylate used as the monofunctional acrylic monomer as shown in Table 3, these monomers were uniformly mixed without developing white turbidity. The solubility of isocetyl myristate in these monomers at 25° C. was from 70 parts by weight to infinite parts by weight as expressed by the maximum parts by weight of isocetyl myristate soluble in 100 parts by weight of the monomer. When isocetyl myristate was mixed with methoxydiethylene glycol acrylate, white turbidity developed, indicating poor compatibility. The solubility of isocetyl myristate in methoxydiethylene glycol acrylate at 25° C. was about 40 parts by weight based on the same expression as above.

The samples were evaluated for a coefficient of dynamic friction, sliding noise and high-temperature storage stability by the following methods.
(1) Application property
When the polymerizable composition was coated to form a protective coating, the resulting coating was visually observed whether it was even or uneven. A uniform coating without variations was rated "good" and a coating with variations was rated "uneven".
(2) Coefficient of dynamic friction
Using a 3.5" magnetic disc drive (manufactured by Plus K.K.), the disc was rotated at a normal chain velocity of 1.4 m/sec. The stress applied to the head under a load of 2 grams was measured, from which a coefficient of dynamic friction μ was calculated. The disc was rated "low" for μ<0.3, "fair" for 0.3≤μ<0.4, and "high" for μ≥0.4.
(3) damage by head sliding
After measurement of a coefficient of dynamic friction μ, the disk surface was visually observed to find occurrence of flaws. The disc was rated "flaw" when the occurrence of flaws was observed and "intact" when no flaws were observed.

The results are shown in Table 3.

TABLE 3

| Sample No. | Radiation-curable compound (acrylic monomer) | | | Application property | Coefficient of friction | Flaw by head sliding |
| --- | --- | --- | --- | --- | --- | --- |
| | Monofunctional | Difunctional | Trifunctional | | | |
| 1 | lauryl acrylate 10 pbw tetrahydrofurfuryl acrylate 10 pbw | neopentyl glycol diacrylate 30 pbw | trimethylolpropane triacrylate 50 pbw | good | low | intact |
| 2 | lauryl acrylate tetrahydrofurfuryl 10 pbw acrylate 10 pbw | hydroxypivalic acid diacrylate neopentyl glycol 30 pbw | pentaerythritol 50 pbw triacrylate | good | low | intact |
| 3 | dicyclopentanyl acrylate 15 pbw | 1,6-hexanediol diacrylate 10 pbw | pentaerythritol triacrylate 75 pbw | good | low | intact |
| 4 | dicyclopentanyl acrylate 40 pbw | 1,6-hexanediol diacrylate 20 pbw | pentaerythritol triacrylate 40 pbw | good | fair | intact |
| 5* | lauryl acrylate 5 pbw | neopentyl glycol diacrylate 35 pbw | trimethylolpropane triacrylate 60 pbw | uneven | high | intact |
| 6* | tetrahydrofurfuryl acrylate 60 pbw | neopentyl glycol diacrylate 10 pbw | trimethylolpropane triacrylate 30 pbw | good | fair | flaw |
| 7* | methoxy-diethylene glycol acrylate 20 pbw | neopentyl glycol diacrylate 30 pbw | trimethylolpropane triacrylate 50 pbw | uneven | high | intact |
| 8* | — | neopentyl glycol diacrylate 50 pbw | trimethylolpropane triacrlyate 50 pbw | uneven | high | intact |

*Comparison

It is evident from Table 3 that better results are obtained when monofunctional acrylic monomers fully compatible with the fatty acid ester are used in specific amounts. In contrast, the advantages of the invention are lost when a monofunctional acrylic monomer less compatible with the fatty acid ester is used (sample No. 7) and when the amount of monofunctional acrylic monomer used is outside the scope of the invention.

Example 2

Sample No. 21 was prepared by the same procedure as in Example 1 except that the polymerizable composition further contained 5 parts by weight of an acrylic oligomer (oligoester acrylate having a molecular weight of 5,000) as an additional UV-curable compound. This sample was evaluated as in Example 1 to find equivalent results.

The samples of Examples 1 and 2 were found to have the fatty acid ester segregated on the surface, with Co>Ci. For all the samples, the amount of fatty acid ester borne on the surface was presumed to be about 200 mg/m² as confirmed by gas chromatography.

The samples were found to have micropores formed in the surface which were filled with the fatty acid ester. The fatty acid ester formed a thin film of 100 μm thick covering the protective coating surface. The micropores were distributed in a surface stratum from the surface to a depth of 1 μm and had an average diameter of 0.2 μm and an average depth of 0.3 μm. There were 150 micropores/10 μm² as viewed from above. No micropores were found in the protective coating except for the surface stratum. These findings were derived from observations under an optical microscope and SEM.

Additional samples similar to the inventive samples of Examples 1 and 2 were prepared by using at least one of the fatty acid esters shown in Table 1 other than those used in Examples and at least one of the monofunctional (meth-)acrylic monomers shown in Table 2 other than those used in Examples or by using only one polyfunctional (meth-)acrylic monomer. These samples were evaluated as in Example 1 to find equivalent results.

The samples were further evaluated by the following tests (4) to (8).

(4) Sliding noise

Using a 3.5" magnetic disc drive (manufactured by Plus K.K.), the disc was rotated in sliding contact with the head at a normal chain velocity of 1.4 m/sec. for detecting sliding noise.

(5) High-temperature storage test

The disc sample was stored for 4 days at 85° C. and RH ~0% before the measurement of a coefficient of dynamic friction as in (2) and sliding noise detection as in (4).

(6) Jitter

There were used a disc drive unit DDU-1510 manufactured by Pulstech Industry K.K. and a jitter meter LJM-1851 manufactured by Leader Electronic Industry K.K. While rotating the disc at a circumferential normal chain velocity of 1.4 m/sec., EFM signals were recorded by irradiating continuous laser light of 780 nm and applying a magnetic field of 200 Oe for modulation. The recording power was 4.5 mW. The jitter of recorded 3T signals was measured at the initial and after storage in (5), that is, 85° C./RH 0%/4 day storage.

(7) Durability

Using the same drive as above, the disc sample was rotated at 670 rpm at a temperature of 70° C. for measuring the time passed until a coefficient of friction of 0.3 was reached. The number of durable passes was calculated from the time.

(8) Chemical resistance

The disc sample on the surface was washed with ethanol before a coefficient of friction was measured as in (2).

It was found that the inventive disc samples are satisfactory in all the parameters, that is, the samples generate no noise upon sliding motion, experience a minimal change in friction coefficient before and after high-temperature storage, generate no sliding noise even after such storage, maintain an acceptable level of jitter both immediately after preparation and after storage, withstand an increased number of passes above the practically acceptable level, and experience a minimal change in friction coefficient even after ethanol washing.

Japanese Patent Application No. 284269/1993 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A magneto-optical disc comprising a recording layer on a substrate and a protective coating on the recording layer wherein the disc is operated for magneto-optical recording in a magnetic field modulation mode such that the protective coating on the outer surface is in sliding contact with a magnetic head, said protective coating is obtained by curing a polymerizable composition with radiation, said polymerizable composition containing a fatty acid ester and a radiation-curable compound mixture which includes a monofunctional (meth)acrylic monomer which homeogenously mixes with said fatty acid ester and a polyfunctional (meth)acrylic monomer, said fatty ester is of the following formula:

$$R^1—COO—R^2$$

wherein $R^1$ is a normal chain or branched saturated aliphatic hydrocarbon residue having at least 10 carbon atoms or an unsaturated aliphatic hydrocarbon residue having at least 10 carbon atoms, and $R^2$ is a branched saturated aliphatic hydrocarbon residue having at least 10 carbon atoms or an unsaturated aliphatic hydrocarbon residue having at least 10 carbon atoms, said polymerizable composition containing 10 to 50 parts by weight of the monofunctional (meth)acrylic monomer and 90 to 50 parts by weight of the polyfunctional (meth)acrylic monomer, provided that the total weight of the monofunctional and polyfunctional (meth)acrylic monomers is 100 parts by weight, and 0.1 to 20% by weight of the fatty acid ester based on the total weight of the monofunctional and polyfunctional (meth)acrylic monomers.

2. The magneto-optical disc of claim 1 wherein said radiation-curable compound mixture further includes an acrylic oligomer, said polymerizable composition containing up to 10% by weight of the acrylic oligomer based on the total weight of the monofunctional and polyfunctional (meth) acrylic monomers, said polymerizable composition containing 0.1 to 20% by weight of the fatty acid ester based on the total weight of the monofunctional and polyfunctional (meth) acrylic monomers and the acrylic oligomer.

3. The magneto-optical disc of claim 1 wherein said polymerizable composition further contains a photo-polymerization initiator in an amount of 1 to 10% by weight based on the total weight of the monofunctional and polyfunctional (meth)acrylic monomers.

4. The magneto-optical disc of claim 2 wherein said polymerizable composition further contains a photo-polymerization initiator in an amount of 1 to 10% by weight based on the total weight of the monofunctional and polyfunctional (meth)acrylic monomers and the acrylic oligomer.

5. The magneto-optical disc of claim 1 wherein $R^1$ is a normal chain saturated aliphatic hydrocarbon residue and $R^2$ is a branched saturated aliphatic hydrocarbon residue.

6. The magneto-optical disc of claim 1 wherein the hydrocarbon residues represented by $R^1$ and $R^2$ each have 10 to 30 carbon atoms.

7. The magneto-optical disc of claim 1 wherein said fatty acid ester is liquid at room temperature.

8. The magneto-optical disc of claim 1 wherein said fatty acid ester has a solubility in said monofunctional (meth)acrylic monomer at 25° C. which is at least 70 parts by weight as expressed by the maximum parts by weight of said fatty acid ester soluble in 100 parts by weight of said monofunctional (meth)acrylic monomer.

9. The magneto-optical disc of claim 1 wherein said monofunctional (meth)acrylic monomer is of the following formula (II):

A—O—R     (II)

wherein A is an acryloyl group ($CH_2$=CHCO—) or methacryloyl group (CH=C($CH_3$)CO—), and R is an alkyl, cycloalkyl or aryl group.

10. The magneto-optical disc of claim 9 wherein the group represented by R has 5 to 20 carbon atoms in total.

11. The magneto-optical disc of claim 1 wherein said fatty acid ester is distributed at the surface of the protective coating.

12. The magneto-optical disc of claim 1 wherein the protective coating includes a plurality of micropores in the surface and said fatty acid ester is contained within the micropores.

13. The magneto-optical disc of claim 1 wherein the content of said fatty acid ester in an outside region of the protective coating extending from the outer surface to one-half of its thickness is greater than the content of said fatty acid ester in an inside region of the protective coating extending from the inner surface adjacent to the recording layer to one-half of its thickness.

14. The magneto-optical disc of claim 1 wherein said protective coating includes micropores distributed in an outside region thereof extending from the outer surface to one-half of its thickness, and the fatty acid ester is contained in the micropores.

15. The magneto-optical disc of claim 1 wherein said protective coating has a thickness of 1 to 30 μm.

16. The magneto-optical disk of claim 5, wherein the hydrocarbon residues represented by $R^1$ and $R^2$ each have 10 to 30 carbon atoms.

17. The magneto-optical disk of claim 11, wherein the content of said fatty acid ester in an outside region of the protective coating extending from the outer surface to one-half of its thickness is greater than the content of said fatty acid ester in an inside region of the protective coating extending from the inner surface adjacent to the recording layer to one-half of its thickness.

* * * * *